A. J. HAWS.

Stopper-Rod and Sleeve-Ladle.

No. 8,662. Reissued April 8, 1879

WITNESSES

Villette Anderson

F. J. Masi.

INVENTOR

Andrew J. Haws by E. W. Anderson

ATTORNEY

UNITED STATES PATENT OFFICE.

ANDREW J. HAWS, OF JOHNSTOWN, PENNSYLVANIA.

IMPROVEMENT IN STOPPER-ROD SLEEVES FOR LADLES.

Specification forming part of Letters Patent No. 205,084, dated June 18, 1878; Reissue No. 8,662, dated April 8, 1879; application filed November 23, 1878.

*To all whom it may concern:*

Be it known that I, ANDREW J. HAWS, of Johnstown, in the county of Cambria and State of Pennsylvania, have invented a new and valuable means of Protecting the Stopper-Rods of Steel Ladles; and I do hereby declare that the following is a full, clear, and exact description of the construction and operation of the same, reference being had to the annexed drawings, making a part of this specification, and to the letters and figures of reference marked thereon, in which—

Figure 1:
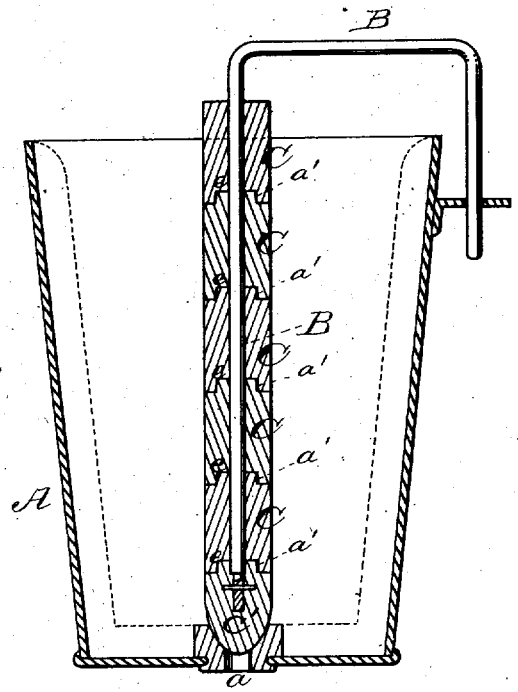
Figure 2:
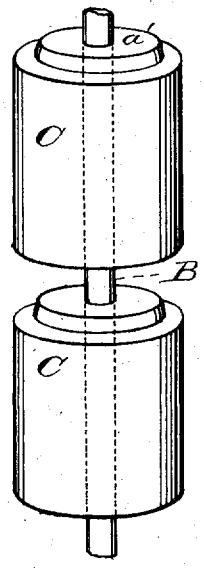

Figure 1 is a representation of a central vertical section through the ladle, stopper, and sleeve sections. Fig. 2 is a perspective view of the stopper and its rod, showing the sleeve-sections in a separated position.

The object of this invention is to provide a simple and inexpensive protection for the stopper-rods of steel ladles; and the invention consists in the novel construction of the centrally-perforated stopper-rod sleeve, formed of baked clay or other refractory material, having its opposite ends provided, respectively, with a socket and projection, to engage with adjoining projections or sockets when the sleeve is placed on the stopper-rod or stem, as hereinafter fully shown and described.

In the accompanying drawings, the letter A designates the ordinary casting-ladle for melted steel, which is used to convey the same from the converter to the ingot-molds. This ladle is provided with the usual perforated nozzle, made of baked fire-clay, in its bottom, as shown in Fig. 1 of the drawings, at *a*.

B represents the stopper-rod, which extends down into the ladle, and is provided on its lower end with a stopper, C′, of clay or other refractory substance.

These parts just described are old and well-known means for the purposes in view. In order to protect the stopper-rod from the action of the melted steel in the ladle, it has been customary to plaster the rod over with tough clay and then to dry it in an oven for the purpose. This is an expensive and troublesome process, and in order to avoid it I have provided the stopper-rod sleeves or sections C, of baked clay. These have central holes or perforations, and are thereby slipped on the stopper-rod, and engage with each other end to end by means of their annular projections or lugs *a′* and corresponding recesses or sockets *e*, which are formed at their ends, a projection being formed at one end and a socket at the other end of each section or sleeve. In this manner the stopper-rod is protected to a sufficient height to reach above the surface of the melted steel in the ladle.

Having described my invention, what I claim, and desire to secure by Letters Patent, is—

A baked-clay stopper-rod sleeve, C, for the protection of the stopper-rod in the liquid steel, composed of removable sections having at one end a socket, *e*, and at the other a projection, *a*, substantially as specified.

In testimony that I claim the above I have hereunto subscribed my name in the presence of two witnesses.

ANDREW J. HAWS.

Witnesses:
A. MONTGOMERY,
CHAS. PFEIFER.